Jan. 19, 1926.  
H. K. JOHNSON  
1,569,980  
COMBINED SPARE TIRE CARRIER AND RIM CONTRACTOR AND EXPANDER  
Filed June 19, 1922    2 Sheets-Sheet 1
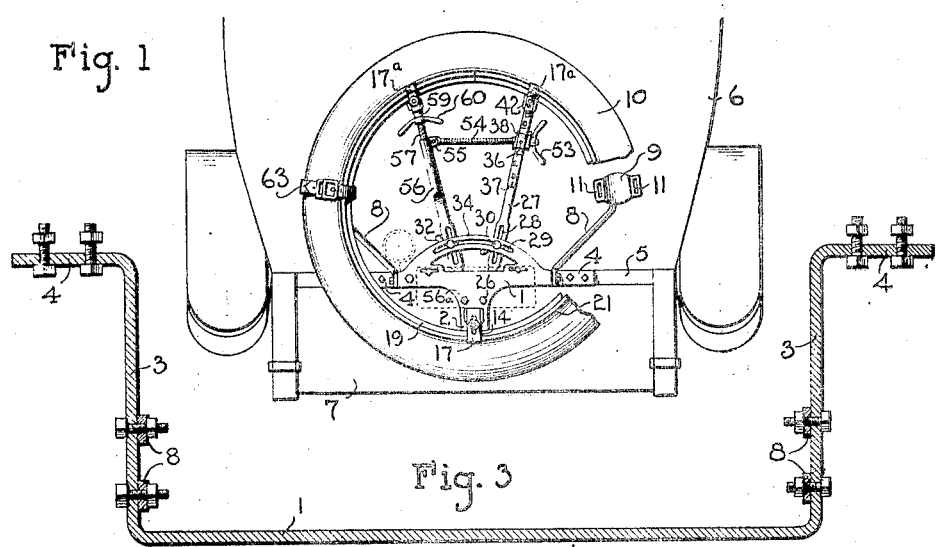
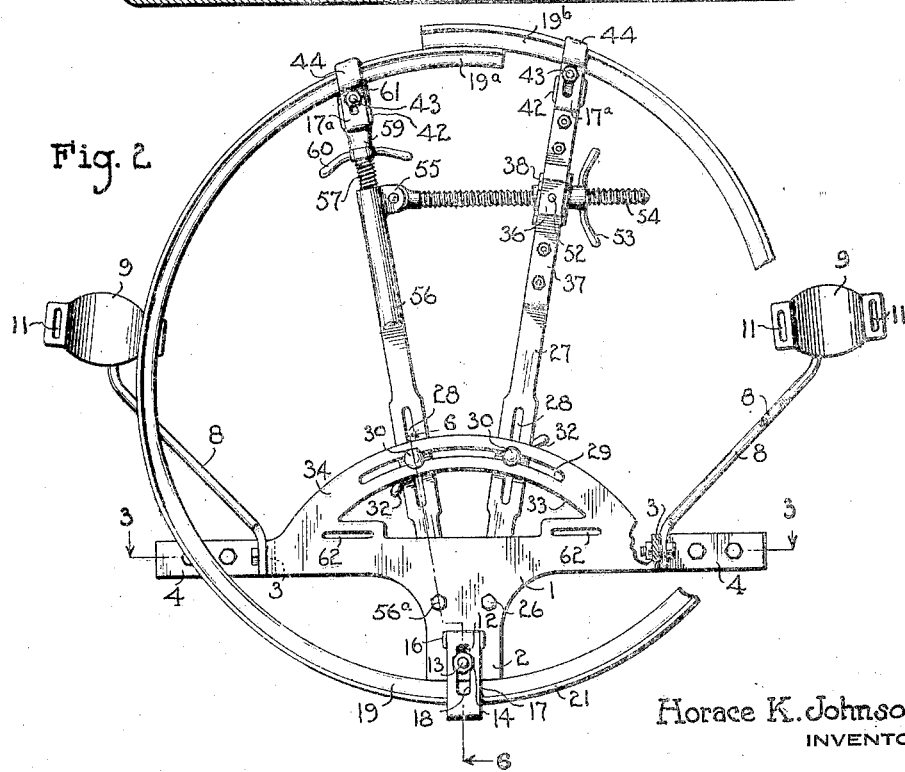
Horace K. Johnson  
INVENTOR

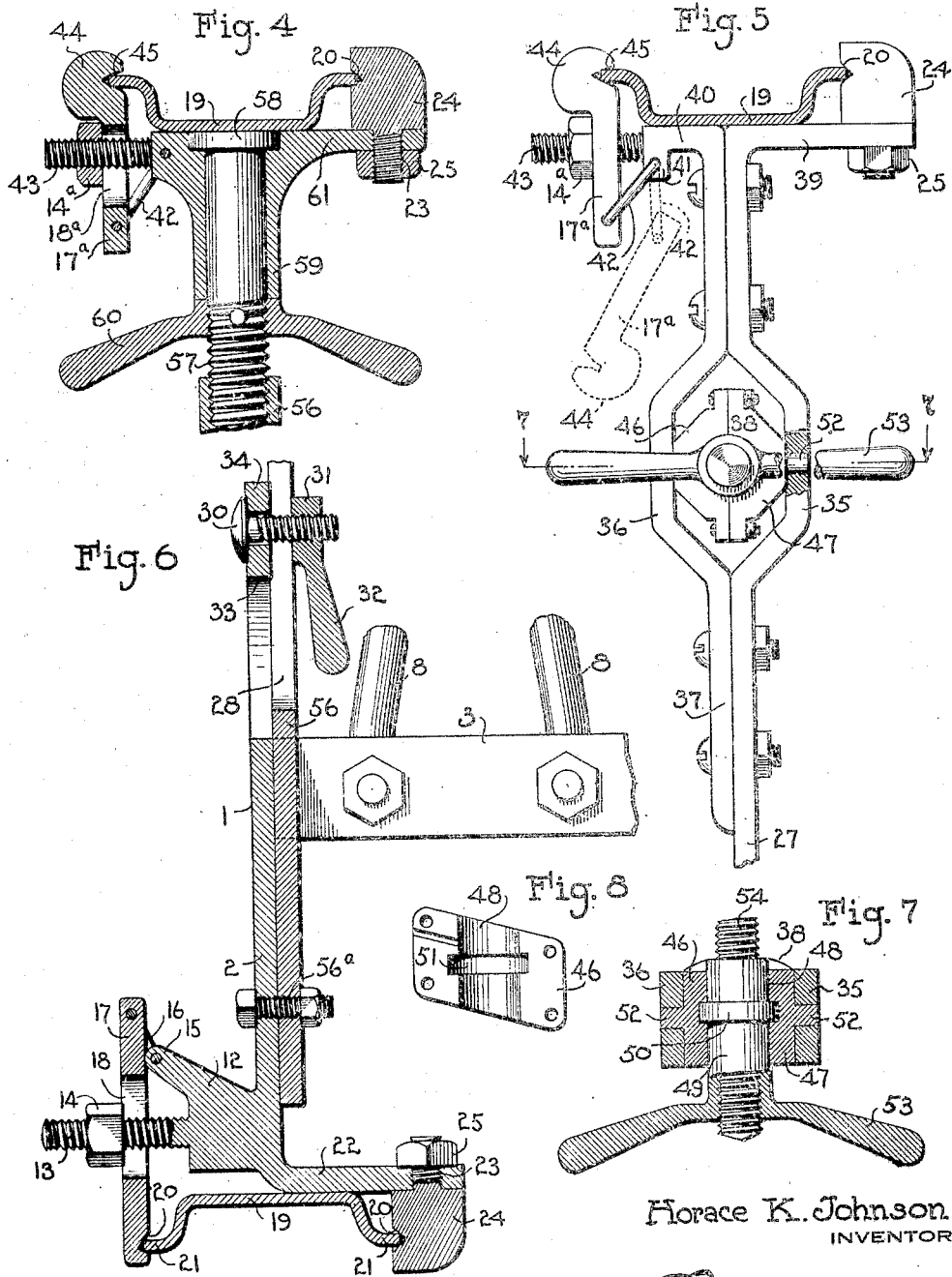

Patented Jan. 19, 1926.

1,569,980

UNITED STATES PATENT OFFICE.

HORACE K. JOHNSON, OF JOHN DAY, OREGON, ASSIGNOR OF ONE-THIRD TO IRA G. BOYCE AND CLARA A. BOYCE AND ONE-THIRD TO FRANK C. HACHENEY, ALL OF JOHN DAY, OREGON.

COMBINED SPARE-TIRE CARRIER AND RIM CONTRACTOR AND EXPANDER.

Application filed June 19, 1922. Serial No. 569,194.

*To all whom it may concern:*

Be it known that I, HORACE K. JOHNSON, a citizen of the United States, residing at John Day, in the county of Grant and State of Oregon, have invented a new and useful Combined Spare-Tire Carrier and Rim Contractor and Expander, of which the following is a specification.

This invention relates to improvements in spare tire carriers adapted to be rigidly secured to an automobile, and has for its object the provision of a tire carrier with means which is capable of adjustment for carrying, contracting or expanding any size or style of demountable split rim.

A further object of the invention is the provision of a rim expander or contractor adapted to be rigidly secured in such a position on an automobile that the device may be readily accessible to a person while standing, whereby the operator will not be required to work on the wheel in the roadway, and furthermore, the use of tools ordinarily employed will be eliminated.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings:—

Fig. 1 is a front view in elevation of the combined tire carrier, expander and contractor secured to the rear of an automobile.

Fig. 2 is a front elevation of the combined tire carrier, expander and contractor detached from the automobile.

Fig. 3 is a horizontal section taken along the line 3—3 of Fig. 2, with distant parts omitted.

Fig. 4 is a sectional view of a rim clamping member with the rim in position.

Fig. 5 is a side view of a portion of one of the pivoted supporting arms.

Fig. 6 is a vertical section of the base member taken along the line 6—6 of Fig. 2.

Fig. 7 is a horizontal section taken along the line 7—7 of Fig. 8.

Fig. 8 is a side view of one section of the pivoted bearing shown in Fig. 7.

Referring to the drawings, 1 indicates a base member in the form of a plate set edgewise vertically and having a depending leg or portion 2 midway of its length and provided with tire-gripping and supporting members for securing the tire in position on the base member 1.

The base member (Fig. 3) comprises a front plate having two rearwardly extending side arms or portions 3, and laterally-extending wings or portions 4 projecting outwardly at right angles from the ends of the side arms 3. The laterally projecting wings or portions 4 are adapted to be secured by means of bolts or rivets to the rear cross member 5 of the chassis of the automobile 6, (Fig. 1), or to the wall of a garage. The side arms 3 of the base member are adapted to space the front plate of the base member forwardly of the gasoline tank 7, when the tire carrier is employed in connection with an automobile, in order that the tire carrier may not interfere with said tank.

Secured at their lower ends to the side arms 3 of the base member are upwardly and outwardly extending bracket arms 8, (Figs. 2 and 6). Each arm is made of two rods secured at spaced points to the side arms 3 and extending upwardly and outwardly and welded together near their upper ends where the two arms meet, and provided with concaved shoes 9, in which the tire 10 is adapted to be seated, when the device is used as a tire carrier. Straps 63 are adapted to be inserted through spaced elongated slots 11 for securing the tire 10 against the shoes 9.

Projecting outwardly from the leg portion 2 of the front plate of the base member 1, is a block 12 (shown in Fig. 6), on which is integrally formed a threaded bolt 13 adapted to receive the nut 14. The block 12 is provided above the threaded bolt 13 with a perforated lug 15, which is adapted to receive the link 16, having pivotal connections with the rim-engaging clamp 17. Midway of its ends, the clamp is provided with an elongated slot 18, which is adapted to receive the threaded bolt 13. The slot 18 is narrow so that the nut 14 will lie against the clamp 17 adjacent the slot for holding the clamp against the rim 19. The lower end of the clamp is provided with a V-shaped transverse groove 20 adapted to receive the peripheral edge of the flange 21 of the rim 19.

Projecting rearwardly from the base member 1 is a lug 22 provided with an internally threaded perforation, adapted to receive the threaded end 23 of a rim-engaging clamp 24. A nut 25 mounted on the threaded stud 23 is adapted to lock the clamp 24 to the underside of the lug 22. The other flange 21 of the rim 19 is adapted to seat within a transverse V-shaped groove in the clamp 24. The bottom of the rim 19 rests against the lower face of the stud 22 when the rim is locked between the clamps 17 and 24.

Pivoted to the base member, at 26, is an oscillatable arm 27. Said arm is slotted at 28, while the base member 1 is provided with a curved slot 29 crossing the slot 28 of the arm 27. A threaded bolt 30 having a head in engagement with the front plate of the base member 1, and passing through the slots 28 and 29, projects beyond the tiltable arm 27. The threaded portion of the bolt which projects beyond the arm 27, receives a nut 31 having an operating handle 32 for tightening the nut and locking the arm 27 in position on the base member 1. The front plate of the base member 1 is cut away as shown at 33 to form the slotted arc-shaped arm 34 in which the slot 29 is formed.

A portion intermediate the ends of the arm 27 is bent outwardly at 35, and cooperates with a similarly bent portion 36 of a strap 37, which is secured to the upper end of the arm 27 to form a looped support for the swiveled bearing box 38.

The strap 37 is secured on opposite sides of the bent-out portion 36 by means of rivets or bolts to the arm 27. The extreme outer end of the arm 27 is bent laterally at right angles to said arm, as shown at 39, to form a portion of the seat or saddle for the rim 19. The extreme outer end of the strap 37 is also bent laterally at right angles, as shown at 40, to form the remaining portion of the seat or saddle for said rim. The end of the strap is then bent downwardly, as at 41, and is perforated transversely, in which is mounted a link 42. The link is pivotally connected at its other end to a clamp 17ª, which is provided with a slot 18ª, (Fig. 4). A threaded stud 43 extends outwardly from the right angle portion 40 of the strap 37 and passes through the slot 18ª. A nut 14ª retains the clamps 17ª in position on the stud 43, when the groove 45 of the enlarged hook 44 of said clamp is in engagement with the outer peripheral edge of the flanged rim 19. The clamp 24 on the outer end of the laterally projecting seat 39 of the arm 37, is mounted in a manner similar to the mounting of the clamp 24 on the rearwardly-projecting lug 22 of the base plate 1, and the same reference numerals are used to refer to corresponding parts.

The bearing box 38 comprises two sections 46 and 47 secured together by means of bolts. Each section is in the shape of a rhombus, as shown in Fig. 8, and has a transverse semi-cylindrical bore 48 adapted to receive a rotatable sleeve 49. An annular shoulder 50 on said sleeve, which is provided to maintain the sleeve in position in the box, is adapted to seat in each half of the diagonally disposed groove 51 in each of the sections 46 and 47 of the box.

Projecting outwardly from the faces of the sections 46 and 47 are integrally formed trunnions 52 adapted to be seated in perforations in the portions 35 and 36, respectively, of the arm 27 and the strap 37. The trunnions 52 permit the sleeve to be oscillated in a vertical plane, while the transverse groove 51 permits the sleeve to be rotated by the operating handle 53 integrally formed on one end of the sleeve.

The sleeve is provided with an internally threaded bore adapted to receive the threaded draw bar 54, which has one end pivotally mounted between ears 55 projecting outwardly from one side of a second arm 56 pivotally mounted at 56ª on the base member 1.

The arm 56 is provided with a slot 28 extending transversely of and crossing the slot 29, through which slots is inserted the threaded bolt 30 provided with a nut 31 and an operating handle 32 for locking the arm 56 in position, (Fig. 6).

Running longitudinally of the upper end of the oscillatable arm 56 is an internally threaded bore adapted to receive a threaded rod 57. The extreme upper end of the rod 57 is devoid of threads, (Fig. 4), and provided with an annular shoulder 58, adapted to seat within a circular recess in the upper end of a head 59, mounted on the upper end of the rod. The shoulder 58 prevents the head from becoming disengaged from the end of the rod, the head being supported at its inner end by means of an operating handle 60 for the rod 57, which is pinned to said rod. The rod is turned by means of said handle to extend and contract the length of said arm. The mounting of the head 59 permits it to be freely rotated on the end of the rod 57. The outer end of the head is enlarged to provide a seat or saddle 61 for the rim 19, which is adapted to be engaged between the clamps 24 and 17ᵃ, which are of similar construction to the like designated clamps on the ends of the arm 27 and strap 37. The description of these parts shown in Fig. 5 will apply to the construction shown in Fig. 4.

The front plate of the base member 1 is slotted as shown at 62 for the reception of some form of securing means for fastening a license plate thereto.

When the device is employed as a tire carrier, the nut 14 on the rim-supporting member connected with the base member is loosened sufficiently to permit the clamp 17 to be swung outwardly for the insertion of the tire equipped rim 19 between the clamps 17 and 24. The nut is then screwed up tightly whereby the rim will be rigidly held in a vertical position with the peripheral edges of the rim 21 engaged in the adjacent transverse grooves 20 of said clamps. The nuts 14ᵃ of the tire-gripping and supporting members located on the ends of the arms 27 and 56, are loosened sufficiently to admit the split ends of the rim between the clamps 17ᵃ and 24. The rim is seated on the saddles of these tire-gripping members, and the nuts are screwed up tightly, thereby holding the rim at three points.

It must be borne in mind that before the rim can be positioned upon the saddles as just described, the threaded rod 57 on the arm 56 will be rotated in the proper direction to position the saddle 61 of said arm for receiving the rim. Likewise the operating handle 53 on the draw bar 54, and closely associated with the arm 27, should be rotated in a proper direction to position the arm 27, whereby its associated clamps 17ᵃ and 24 and saddle 39, 40 may receive the rim. After the clamps have been securely drawn up tightly on the rim, the operating handles 53 and 60 are respectively actuated to maintain the arms in a rigid position when supporting the tire-equipped rim. Furthermore, the operating handles 32 attached to the nuts 31 are likewise actuated to properly lock the arms 27 and 56 from movement. The tire is further secured by means of the straps 63 passing through the slots 11 of the shoes 9, and looped around the tire and securely buckled.

When it is desired to break a rim, as shown in Fig. 2, the operating handle 60 on the rod 57 is actuated inwardly to move the end 19ᵃ of the rim out of circular alinement with the end 19ᵇ of the rim. After loosening the nuts 31, the operating handle 53 on the arm 27 is then actuated to draw the arms 56 and 27 towards each other, and move the end 19ᵃ of the rim inwardly in overlapping relation, thereby retracting the rim. An opposite movement of the operating members 60 and 53 will cause the ends 19ᵃ and 19ᵇ to move relatively to each other and back into circular alinement. All the movable parts are actuated and held in position by means of threaded connections, and therefore it will be seen that rattling of the device is prevented.

The base member or bracket 1 may be of any suitable design or construction for attaching the tire carrier or rim spreader to any convenient part of an automobile, or to a table, or to the wall of a garage when the device is used for expanding or contracting rims in the garage. I prefer, however, to combine the parts as shown, as it permits the rim expanding and contracting means to form a part of a tire carrier.

When the device is employed as a tire carrier on an automobile, it is ordinarily connected to the rear transverse member 5 of the chassis, so that the tire carrier will be supported at an elevation where it will be most convenient for expanding or contracting a rim at a height above the roadway, and where the operator of the car will not be required to stoop or bend over the device when removing and replacing tires on a rim. Furthermore, no tools are required to aid in contracting or expanding a rim or removing a tire from the rim, since the device is complete in itself for such purpose.

What is claimed is:—

1. In a rim contractor and expander, a rigid base member adapted to be secured to a fixed support, clamping means on the base member for engaging a split wheel rim at a point remote from the split portion, a pair of arms oscillatable toward each other in the same vertical plane, means for pivotally connecting said arms to said base member, clamping means on the ends of said arms for engaging the ends of the split portion at each side thereof, means connecting the arms together for moving said arms toward and from each other with the ends of the split rim connected thereto, and means for moving one of said arms so as to shift the split ends of the rim out of circular alignment.

2. In a device of the class described, a rigid base member adapted to be secured to a fixed support, a pair of arms oscillatable in the same vertical plane, means for pivotally connecting said arms to said base member, means connecting said arms together between their pivotal connections and their outer ends and for moving said arms toward or from each other, clamping means on the base member and on the ends of the arms for gripping portions of a split wheel rim, one of said arms being constructed to be extended or contracted for expanding or contracting said rim.

3. In a device of the class described, a base member adapted to be secured to a fixed support, a pair of arms oscillatable in the same vertical plane, mounted on the base member, means connecting the arms together for moving the arms toward or from each other, clamping means on the base member and on the ends of the arms for gripping portions of a wheel rim, and brackets extending laterally outwardly and upwardly from the opposite ends of the base member outside the said arms and having means at their outer ends for embracing a tire seated upon the rim.

4. In a device of the class described, a base member adapted to be secured to a fixed support, a pair of arms oscillatable in the same vertical plane, means connecting the arms together for moving the arms toward or from each other, clamping means on the base member and on the ends of the arms for gripping portions of a rim, and means for independently locking each of the arms to the base member in a predetermined position relative to each other.

5. In a device of the class described, a base member adapted to be secured to a fixed support, an arm pivotally mounted on the base member, means on the base member for rigidly securing a wheel rim in position on said member, an extensible arm pivotally mounted on the base member and oscillatable in the same vertical plane with the first-mentioned arm, means on the ends of both arms for clamping the ends of a rim thereto, means operatively connecting the arms together whereby said arms may be moved toward and from each other, the extensible arm adapted to be moved radially on the base member for moving one end of the rim out of circular alinement with the other end of said rim.

6. In a device of the class described, a base member rigidly connected to a fixed support, means on the base member for rigidly connecting a wheel rim thereto, a pair of oscillatable arms pivoted on the base member, a clamping member mounted on the end of one of the arms for gripping an end of a split rim, and a clamping member on the end of the other arm adapted to firmly grip an end of the split rim, the last-mentioned clamping member being movable radially for moving the ends of the rim out of circular alinement, and means operatively connecting the arms together whereby said arms may be moved toward or from each other.

7. In a device of the class described, a base member adapted to be secured to a fixed support, clamping means adapted to grip a wheel rim at spaced points for supporting the rim in position on the base member, said clamping means comprising a saddle adapted to support the rim, a rigid clamp on one end of the saddle provided with a groove to seat the peripheral edge of one flange of said rim, and a swingable clamp spaced from the rigid clamp on the saddle and also provided with a groove adapted to engage the peripheral edge of the other flange of the rim, and means for locking the swingable clamp in position.

8. A device of the class described, comprising a base member adapted to be secured to a fixed support, and provided with means for securely holding a wheel rim on the base member, arms pivotally mounted on the base member provided with means for gripping portions of the rim, a threaded draw bar pivotally mounted on one of the arms, a rotatable sleeve provided with an internally threaded bore swively mounted on the other arm and adapted to engage the threads on said draw bar, and a handle connected with said sleeve for rotating the same whereby the pivoted arms are moved toward and from each other.

9. A device of the class described, comprising a base member adapted to be secured to a fixed support and provided with means for securely holding a wheel rim on the base member, arm pivotally mounted on the base member provided with means for gripping portions of the rim, a threaded draw bar pivotally mounted on one of the arms, a rotatable sleeve provided with an internally threaded bore swively mounted on the other arm and adapted to engage the threads on said draw bar, and a handle connected with said sleeve for rotating the same whereby the pivoted arms are moved toward and from each other, one of said arms being extensible and cooperating with the means for oscillating the arms whereby the rim is contracted or expanded.

10. A device of the class described, comprising a base member adapted to be secured to a fixed support and provided with means for securely holding a wheel rim on the base member, arms pivotally mounted on the base member provided with means for gripping portions of the rim, a threaded draw bar pivotally mounted on one of the arms, a rotatable sleeve provided with an internally threaded bore swively mounted on the other arm and adapted to engage the threads on said draw bar, a handle connected with said sleeve for rotating the same whereby the pivoted arms are moved toward and from each other, one of said arms being extensible and cooperating with the means for oscillating the arms whereby the rim is contracted or expanded, said sleeve being provided with a shoulder adapted to seat within an annular socket in the swiveled bearing for maintaining the sleeve in position relative to the oscillatable arm.

11. In a device of the class described, a base member adapted to be secured to a fixed support, a pair of arms pivotally mounted on the base member, and means operatively connecting said arms together to cause said arms to move toward or from each other, means on the base member for rigidly supporting a split rim in position on the base member, means on one of the arms adapted to rigidly support one end of the split rim, the other arm being provided with an internally threaded bore, a threaded rod mounted within the bore and adapted to be extended or retracted, and clamping means on the end of said threaded rod for gripping the other end of the split rim.

12. In a device of the class described, a base member having means for securing the same to a fixed support, a pair of arms pivotally mounted on the base member and extending therefrom, means operatively connecting said arms to cause them to move toward or from each other, means on the ends of said arms for clamping a split rim at different points, means on the base member for clamping the rim at a different point, said arms being slotted near their pivoted ends, a slotted guide across which the said arms are caused to move, and a bolt and nut passing through the slots of the guide and each arm to hold the arms in any period of adjustment.

13. In a device of the class described, a base member having means for securing the same to a fixed support, a pair of arms pivotally mounted on the base member, means at the outer ends of said arms to grip a split rim at different points, a guide at one side of said arms near their pivoted ends, and means for adjustably connecting the arms to said guide to hold the arms in any point of lateral adjustment.

14. In a device of the class described, the combination with a base member, a leg depending from the base member, clamping means pivoted on said leg for engaging a wheel rim at an intermediate point, a pair of arms independently pivoted to the base member and each carrying clamping devices for engaging the rim at opposite sides of the split portion of the rim, one of said arms being extensible, means connecting the arms for moving the same laterally relatively to each other, and other means provided on the base member for fixing the arms at any period of lateral adjustment.

15. In a device of the class described, the combination with a base member, means carried by the base member for engaging a split wheel rim at a point of its circumference, two arms pivoted to the base member and extending therefrom, and clamping devices carried by the outer ends of the arms for engaging the split ends of the wheel rim, one of said arms being made extensible, and the extensible arm having the clamping device thereon adapted to be rotated.

16. In a device of the class described, the combination with an arm having an internally threaded bore, a rod having a threaded portion and a plain portion at the outer end of the rod, an annular shoulder at the end of the plain portion, the threaded portion of the rod being adapted to screw in the bore of the arm, a head swiveled on the plain portion of the rod and provided with a recess to receive said shoulder, means on the rod for rotating the same, and clamping devices carried by the head for engaging a wheel rim.

17. In a device of the class described, a movable element having a threaded rod with a plain portion beyond the threaded portion of the rod, a head swiveled to the plain portion of the rod, a collar on the end of the rod and engaging the head to hold it on the rod, a handle mounted on the threaded portion of the rod and adapted to engage the head, and clamping means provided on the head for engaging the wheel rim.

18. In a device of the class described, the combination with the base member, means depending from the base member and provided with clamps to engage a split rim at one point, pivoted arms connected to the base member and each carrying clamping devices for engaging the split rim near the ends thereof, and means for moving said arms toward or from each other, one of said arms being made extensible.

19. In a device of the class described, clamping members engaging with the rim of the wheel, consisting of a seat or saddle, a fixed clamp at one side having a groove to receive the outstanding edge of the rim, a swinging clamp at the other side also provided with a groove to receive the outstanding edge of the rim, a link for hanging the swinging clamp and allowing it to swing away from the rim, and means for securing the swinging clamp in engaging position with respect to the rim.

20. In a device of the class described, clamping means adapted to grip a rim at spaced points for supporting the rim, said clamping means comprising a seat or saddle for the rim, a rigid clamp at one end of the seat or saddle having a groove to receive the edge of one flange of the rim, a swingable clamp having a groove cooperating with said rigid clamp for gripping a rim, the swingable clamp being supported by a link, and means for locking the swingable clamp in position on the rim.

21. In a device of the class described, a base member comprising a single plate having two rearwardly extending side arms and two laterally extending wings formed in one piece, means provided on the wings for securing the same to a fixed support, a depending leg provided on the said plate of the base member at an intermediate point of its length, clamping means carried by said leg for engaging with the split rim of a wheel opposite the split portion thereof, and expanding and contracting means carried by and extending from the base member and engaging with the wheel rim at each side of the split portion.

In testimony, that I claim the foregoing as my own, I have hereto affixed my signature.

HORACE K. JOHNSON.